Figure 1:
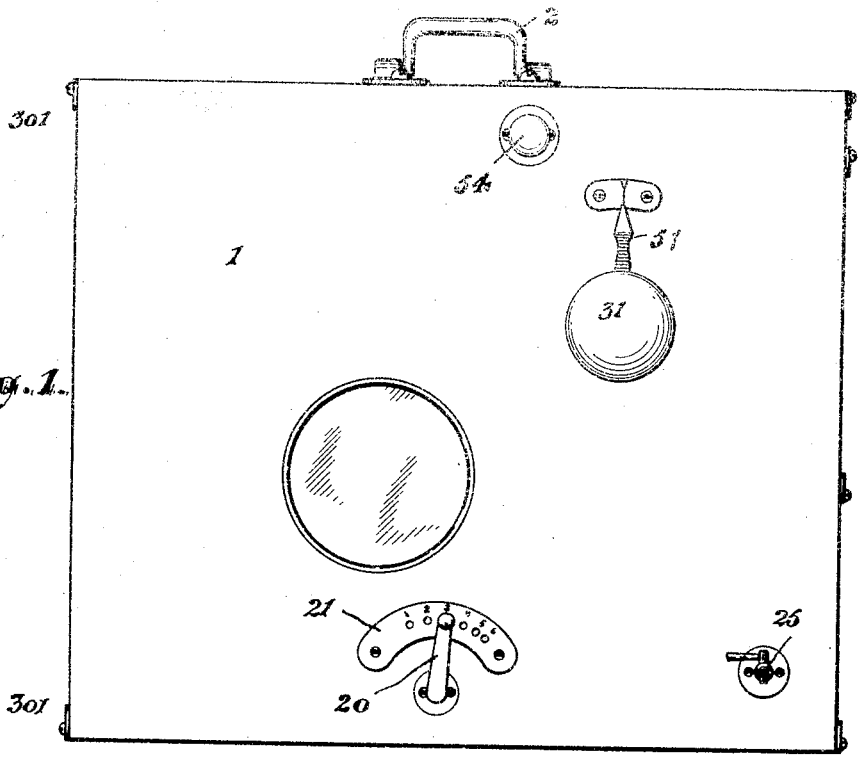

No. 779,748. PATENTED JAN. 10, 1905.
H. A. STEVENSON & A. N. BRUNNER.
MECHANICAL DEVELOPER AND PORTABLE DARK ROOM.
APPLICATION FILED MAY 20, 1904.

6 SHEETS—SHEET 1.

WITNESSES:
Ralph Lancaster
Russell M. Everett

INVENTORS
H. A. Stevenson,
Alex. N. Brunner,
BY
Charles H. Pell,
ATTORNEY.

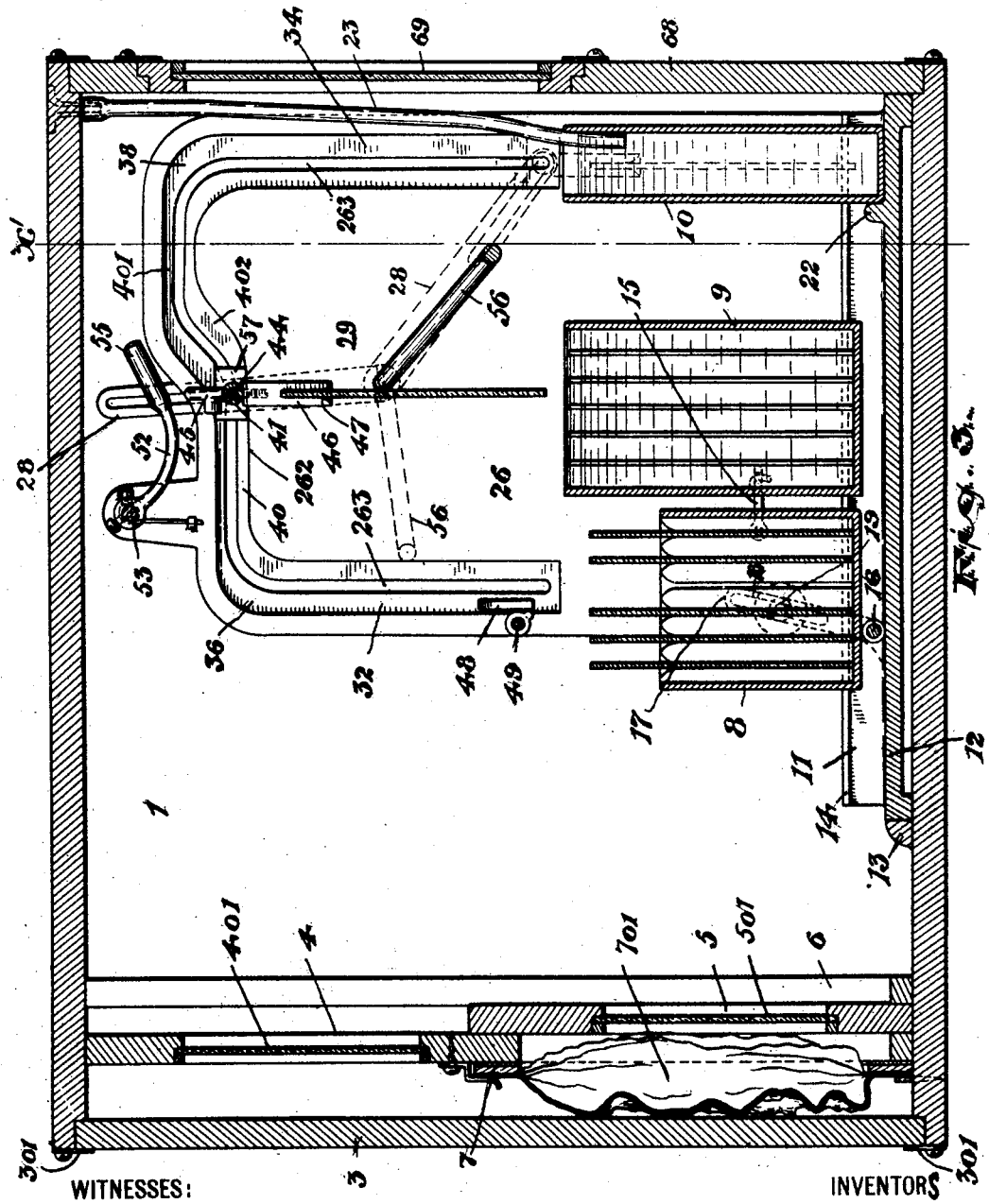

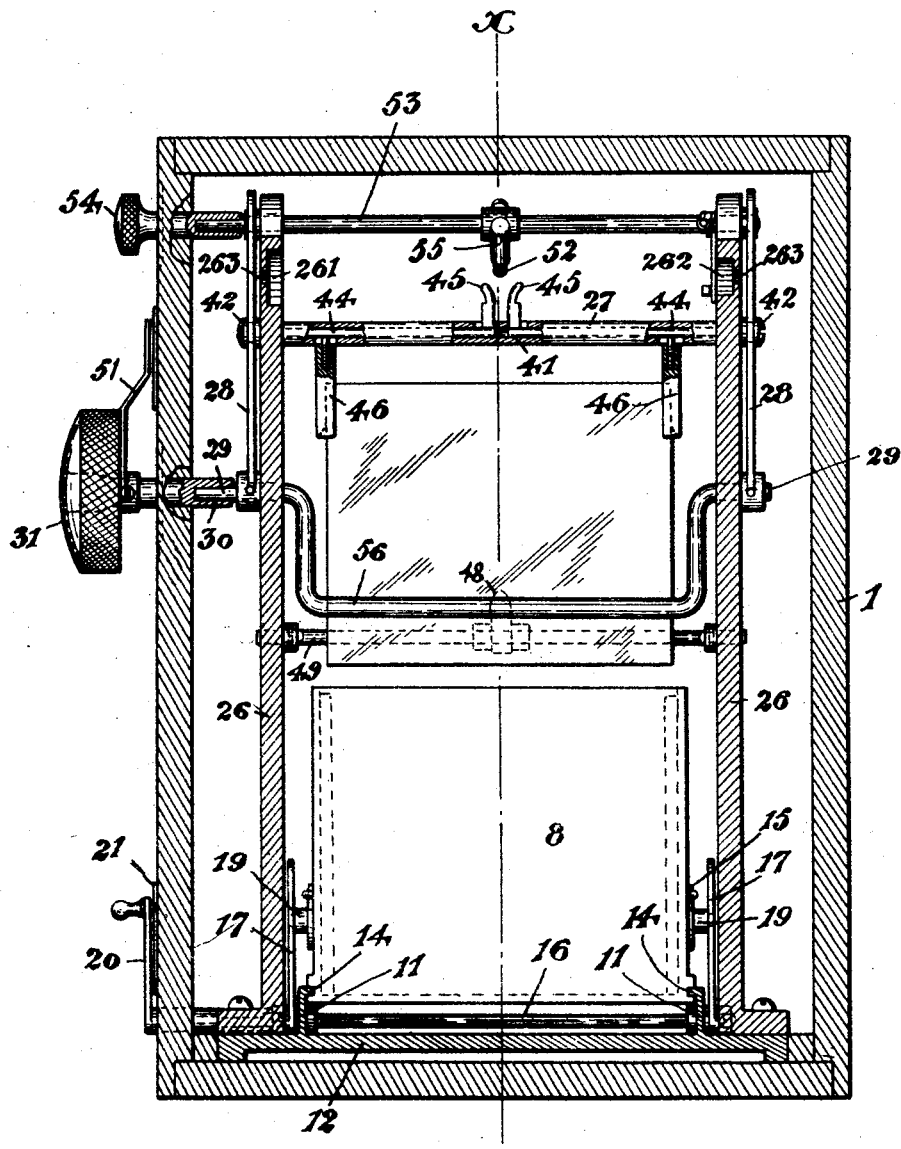

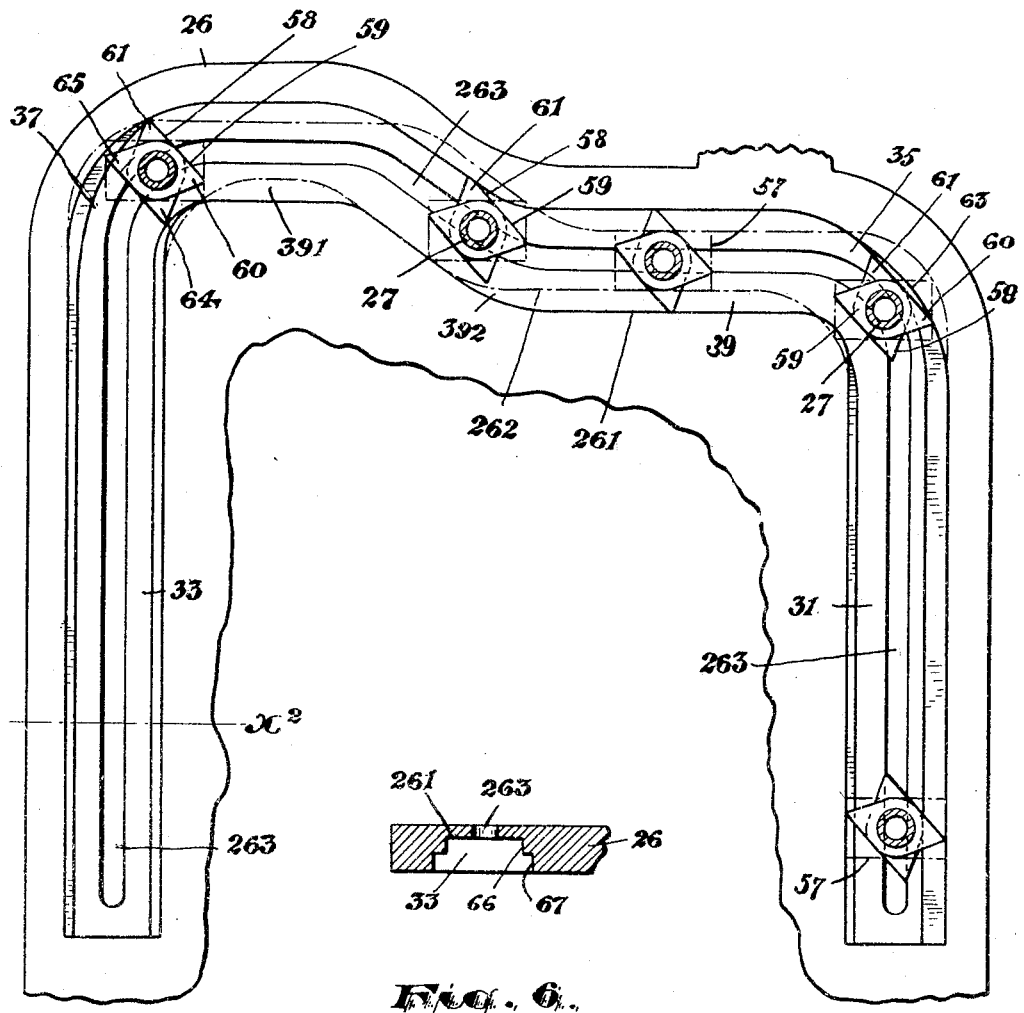

No. 779,748. PATENTED JAN. 10, 1905.
H. A. STEVENSON & A. N. BRUNNER.
MECHANICAL DEVELOPER AND PORTABLE DARK ROOM.
APPLICATION FILED MAY 26, 1904.
6 SHEETS—SHEET 5.
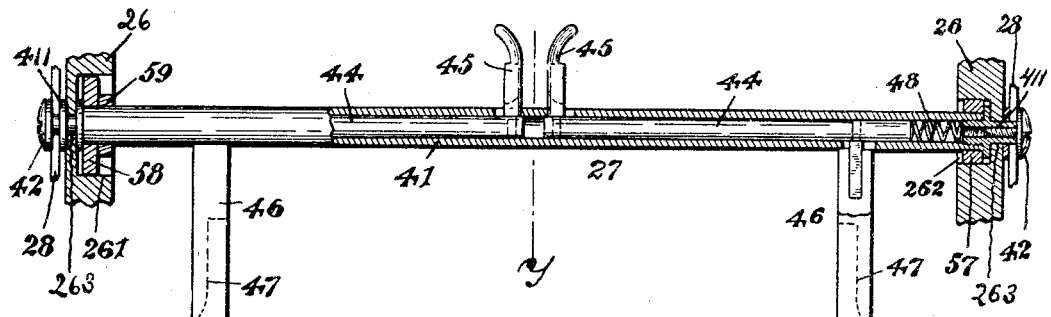
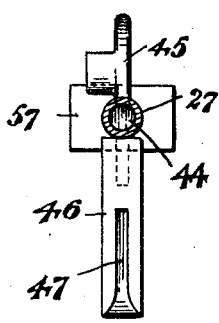 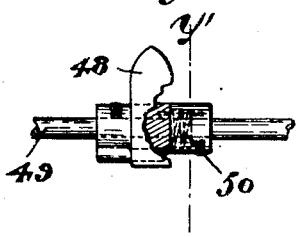 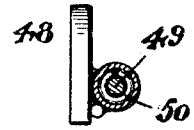
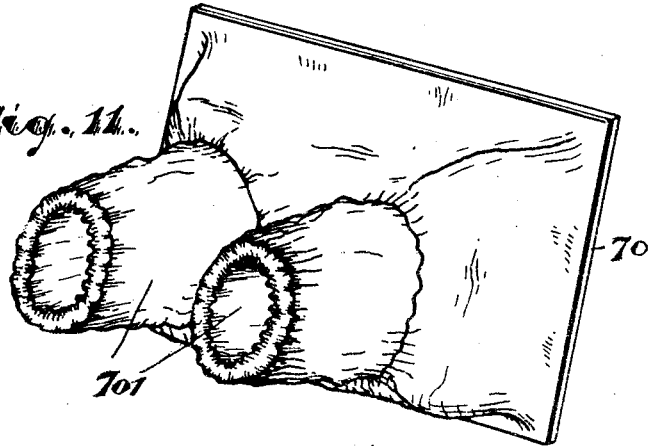
WITNESSES:
Ralph Lancaster
Russell M. Everett
INVENTORS
Harry A. Stevenson,
Alexander N. Brunner,
BY
Charles H. Peel,
ATTORNEY.

No. 779,748. PATENTED JAN. 10, 1905.
H. A. STEVENSON & A. N. BRUNNER.
MECHANICAL DEVELOPER AND PORTABLE DARK ROOM.
APPLICATION FILED MAY 26, 1904.

6 SHEETS—SHEET 6.

WITNESSES:
Ralph Lancaster
Russell M. Everett

INVENTORS.
Harry A. Stevenson,
Alex. N. Brunner,
BY
Charles H. Pell,
ATTORNEY.

No. 779,748. Patented January 10, 1905.

UNITED STATES PATENT OFFICE.

HARRY A. STEVENSON, OF EAST ORANGE, AND ALEXANDER N. BRUNNER, OF NEWARK, NEW JERSEY.

MECHANICAL DEVELOPER AND PORTABLE DARK ROOM.

SPECIFICATION forming part of Letters Patent No. 779,748, dated January 10, 1905.

Application filed May 26, 1904. Serial No. 209,935.

*To all whom it may concern:*

Be it known that we, HARRY A. STEVENSON, residing at East Orange, and ALEXANDER N. BRUNNER, residing at Newark, in the county of Essex and State of New Jersey, citizens of the United States, have invented certain new and useful Improvements in Mechanical Developers and Portable Dark Rooms; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to the development of photographic plates and papers; and the objects of the invention are to avoid the use of a dark room into which the operator must enter for developing and to provide instead a small portable device in which the work can be done by inserting the hands; to enable plates or papers to be transferred from their holders to the said developer without exposing them to the light; to permit a free inspection of the plates or papers as they are being developed; to enable the plates or papers to be handled mechanically in developing and not with the fingers; to enable any number of plates or papers to be inserted at one time for development; to enable a plate to be covered instantly with developing fluid; to economize said fluid and enable the plate to be moved or agitated in the same while developing; to enable the developing fluid to be changed or drawn off from the outside of the device; to provide a device which can be utilized as a camera by applying a lens to its front end; to secure a construction enabling the interior parts or developer mechanism to be removed and the casing or box used for the handling of plates or papers without exposure in any manner common to the use of a dark room—as, for instance, for loading plate-holders; to thus provide a portable device which can be used for every purpose for which a dark room is used, and to obtain other advantages and results, some of which may be hereinafter referred to in connection with the description of the working parts.

The invention consists in the combined mechanical developer and portable dark room herein described and in the arrangements and combinations of parts of the same, all substantially as will be hereinafter set forth and finally embraced in the clauses of the claim.

Figure 2:
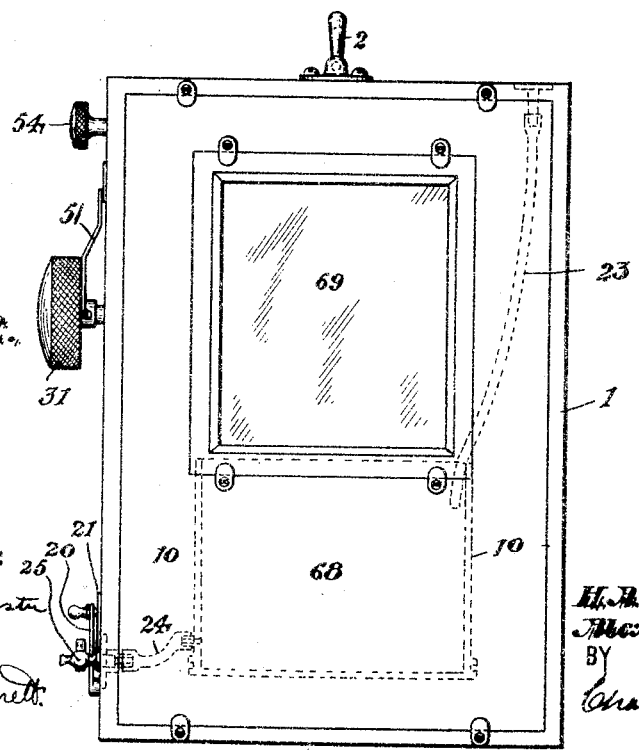
Figures 12, 13:
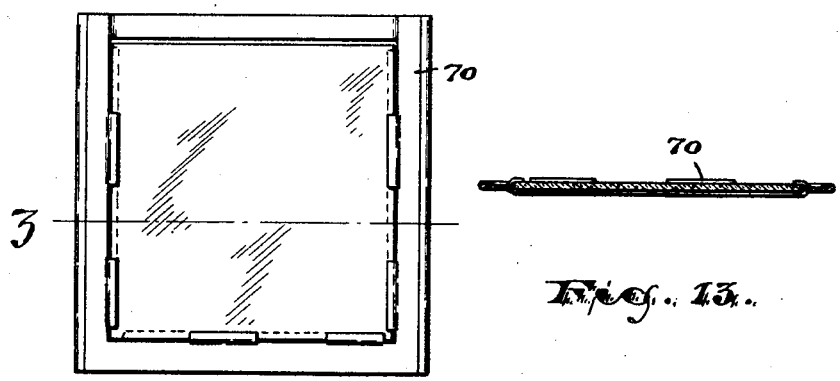
Figures 14, 15:
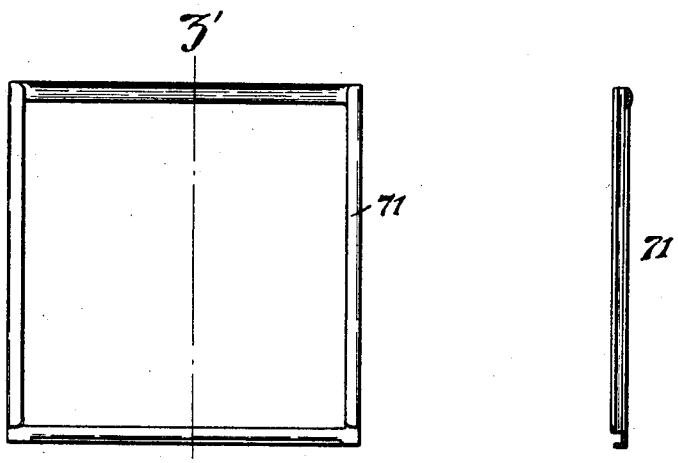

Referring to the accompanying drawings, in which like numerals of reference indicate corresponding parts in each of the several figures, Figure 1 is a side elevation of our complete device, showing certain operating-handles; and Fig. 2 is a front end elevation of the same. Fig. 3 is a central longitudinal vertical section taken upon line $x$, Fig. 4. Fig. 4 is a transverse vertical section on line $x'$, Fig. 3. Fig. 5 is a detail view of a certain slideway, showing the positions of the slide at different points therein and also showing in outline the relation of a coöperating slideway and slide; and Fig. 6 is a cross-section of the same on line $x^2$, Fig. 5. Fig. 7 shows, partly in section, a certain carrier-bar in position in said slideways. Fig. 8 is a cross-section of said carrier-bar as on line $y$, Fig. 7. Fig. 9 is a rear elevation of a tripping device for releasing the plates from said carrier-bar, and Fig. 10 is a section of the same on line $y'$, Fig. 9. Fig. 11 shows in perspective certain flexible cuffs which provide means for inserting the hands into our device without admitting light. Fig. 12 is a side view of a plate mounted in a kit to give it the required size adapted to be engaged by the carrier-bar. Fig. 13 is a cross-section of the same upon line $x$, Fig. 12. Fig. 14 is a side view of a frame for carrying papers throughout the operations of our improved device, and Fig. 15 is a section of the same upon line $z'$, Fig. 14.

In said drawings, 1 indicates a box or case which may be of any suitable construction and of any desired size or form, being preferably provided with carrying means, such as the handle 2 shown in the drawings, and adapted to inclose within itself the working parts or mechanism of our improved device. Said case has at its rear a removable door 3, adapted to open the entire end and being mounted in any well-known manner, as by the buttons 301 shown. Within said door 3 and at a little distance therefrom the box is transversely closed by overlapping upper and lower sashes 4 5, the upper one of which is fixed and the lower adapted to slide vertically in guideways 6. Said lower sash 5 preferably slides at the inner side of the upper sash 4, and at the outer side of said upper sash and extending from the same to the bottom of the casing is removably mounted a frame 7, which carries flexible cuffs 701, adapted to receive the hands of the operator and enable him to pass them into the casing without admitting light. Said cuffs, it will be understood, when not in use lie between the sashes and door 3, described. Furthermore, the sashes 4 5 are provided with panes 401 501 of ruby glass, so that when the operator's hands are in the cuffs 701 and the lower sash 5 slid upward he can see through the glass what he is handling in the casing. Within the said casing 1 at its rear part is stationed a plate-holding box or rack 8, and forward of the same is a second box 9, adapted to contain the fixing-bath. A third box 10 at the front of the machine and in line with the other two is adapted to contain the developer. Said boxes are all mounted on tracks 11, fastened upon a removable board or base-piece 12, adapted to be slid into the said casing from its front, a stop 13 determining the position of said support 12. The tracks 11 each consist of an upright web having at its top an inwardly-turned flange 14, adapted to enter grooves in the sides or ends of the said boxes. The plate-rack 8 and the box 9 for the fixing solution are secured in a fixed relative position, preferably by means of hooks 15, extending between the two boxes, and both said boxes are adapted to slide freely on the said tracks 11. Beneath said boxes 8 9 a transverse shaft 16 is mounted in the webs of the track-rails 11 and provided with fixed arms 17, extending upward at the ends of the said boxes, each arm being slotted, as at 18, to receive a pin 19 upon one of the boxes, preferably the plate-holding box 8. Said shaft 16 projects through the wall of the casing 1 and outside the same is provided with a handle or crank 20, by means of which the shaft can be turned to slide the said boxes 8 and 9 into any desired position. A gage or scale 21 upon the outside of the box shows to the operator the position of the said boxes. The developer-box 10 does not slide upon the said rails 11 in the same sense as do the other two boxes 8 9, but simply to permit its insertion and removal, a stop 22 on the plate 12 determining its proper position. From said developer box or tank 10 a flexible tube 23 leads to the top of the casing to receive a detachable funnel, (not shown,) by means of which developing fluid can be supplied to the tank. An outlet is also provided at one end of the lower part of the said tank and adapted to be connected by tubing 24 with a faucet 25, opening through the side of the casing and by means of which the developer-tank can be emptied or partially emptied when desired. Preferably said exit or outlet opens from the tank at a point sufficiently above the bottom of the same to prevent drawing off any sediment therein, and thus the liquid drawn off can be used over again. Upon said base-piece 12, outside the rails 11 and three tanks mounted thereon, are vertical side pieces 26, which extend upwardly to the top of the casing and are adapted to support or carry the means which we have provided for transferring plates from one of said boxes or tanks to another. At their inner facing sides said side plates 26 have grooves or slideways 261 262, as shown more particularly in Fig. 5, and in which a certain plate-carrying bar 27 is adapted to slide or travel at its opposite ends, as hereinafter described. Said grooves or slideways 261 262 are both slotted longitudinally along the central lines of their bottoms, as at 263, to permit the ends of said shaft 27 to project outside the side pieces 26 and receive slotted arms 28 28, projecting from a shaft 29, fulcrumed centrally in the said plates 26. Said shaft 29 is at one end adapted to receive the shank 30 of a turning-handle 31, adapted to lie outside the casing 1 in a position convenient to the operator, whereby he may turn the said shaft 29 to cause the carrying-bar 27 to travel in its grooves or slideways, as will be understood. Of the two grooves or slideways 261 262 in the said side plates 26 26 each has two vertical end portions 31 33, (or 32 34,) one of which, as 31, (or 32,) is adjacent to the plate-holding box 8 and the other of which, 33, (or 34,) is in transverse line with the developer 10. These two vertical portions 31 33 (or 32 34) are connected at their tops by bends 35 37, (36 38,) respectively, with horizontal portions 39 391, (or 40 401,) which extend toward each other. One of said horizontal portions, preferably the one, 391, (or 401,) which is next the developer-tank, is higher up than the other, for reasons which will hereinafter appear, and the adjacent ends of the two horizontal portions are connected by a curved portion 392, (or 402.) Said carrying-bar 37 comprises a tube 41, having screwed into its extremities end pieces 411, which project through the slots 263 and through the slotted arms 28 of the shaft 29 and receive headed screws 42 to hold the said parts in position. Within each end portion of said tube 41 is arranged a sliding rod 44, provided at its end next the middle of the shaft with an operating-arm 45, projecting through a slot in the tube, and at its opposite end with a carrying-arm 46, also projecting through a slot in the tubular shaft. Said carrying-arms are each adapted at its side next the other arm to engage the edge of a plate, either being grooved, as shown at 47, Fig. 7, or in any other suitable manner.

Spiral springs 48 in said tube 41, between the outer ends of the sliding rods 44 and the end pieces or caps 42, normally hold said sliding rods toward each other, so as to press the carrying-arms 46 into frictional holding engagement with the edges of a plate, it being understood that the arms are stationed a distance apart corresponding to the size of the plate to be handled. When, therefore, the carrying-bar 27 is slid by means of the handled shaft 29 downward into the rear upright portions 31 32 of the grooves or slideways 261 262, the said holding-arms 46 are in position to engage a plate in the plate-holding box 8, and for automatically spreading said arms to receive the plate we provide a spreader 48, mounted upon a transverse shaft 49, and which spreader passes between the two operating-arms 45 45 as the descending carrying-bar brings the carrying-arms into position to grasp a plate. As soon as the spreader is passed the holding-arms 47 clamp upon the edges of the plate, which can then be raised by reversing the direction of movement of the carrying-bar in its grooves. As said carrying-bar comes up the spreader 48 is pushed idly out of the way, being for that purpose hinged eccentrically upon its shaft 49 and held resiliently in normal tripping position by a spring 50. The carrying-bar then passes along its grooves or slideways to the forward vertical end of the same, where its downward movement submerges the plate in the developing-tank 10. After being developed the plate is raised from the developer-tank and carried backward to the lower horizontal portions 39 40 of the grooves or guideways, from where it is dropped into the fixing-solution tank 9. The point at which the plate should be dropped is indicated by a pointer 51 for the turning-handle 31 at the outside of the casing, and to accomplish such dropping we have provided a spreading-arm 52, projecting from a transverse shaft 53 at the top of the side pieces 26 and adapted to be operated by a handle 54 at the outside of the casing. This spreading-arm is adapted at its end 55 to enter between the operating-arms 45 45 of the carrying-bar and force the sliding rods 44 thereof apart to disengage the holding-arms 46 46 from the plate.

The shaft 29 for moving the carrying-bar is bent between the side plates 26 26 into a ⌊⌉ shape, and this bent portion 56 is so disposed with reference to the slotted arms 28 that it passes under a plate being carried when the carrying-bar lies in the highest parts of the slideways or grooves 261 262—viz., the horizontal portions 391 401. Furthermore, the said bent portion 56 lies at one side when a plate is to be dropped into the fixing-bath 9, all as will be seen upon reference to Fig. 3.

It will be understood that the developer-tank 10 does not move in use and that the plate-holder 8 and fixing-tank 9 are slid along together for successive plates, as indicated by the scale 21.

To secure a movement of the carrying-bar 27 along its grooves or slideways without turning or rotating, we have provided said bar with holding means next to be described. At one end of said bar is arranged upon the same a fixed rectangular block 57, two of whose sides are vertical and the other two horizontal. This block 57 lies in the groove or slideway 262, and when the carrying-bar is traveling along any straight portion of said way the said block 57 will engage at one pair of its opposite edges the opposite side walls of the groove and prevent turning of the carrying-bar, as will be understood. To prevent turning of the carrying-bar 27 in passing around the bends or curves of its pathway, its end opposite the one provided with the block 57 has two fixed diamond-shaped shoes 58 59. These shoes are adapted to lie in the groove 261 and always engage the side walls of said groove at two points on opposite sides of the bar when the same is traveling around the curves in said groove, whereby the bar will be held against turning while the square block 57, before described, is inoperative. Said diamond-shaped shoes are mounted on the carrying-bar with their longer axes at an angle to each other of something less than a right angle, as shown in the drawings, and the positions assumed by said diamond-shaped shoes at different points of the groove or slideway are illustrated more particularly in Fig. 5 of the drawings. Upon reference to said figure it will be clearly seen that in the straight portions 31 39 391 33 of the groove 261 the diamond-shaped shoes perform no function, the carrying-bar being held at these points by the rectangular block 57 on the other end of the bar and which slides in groove 262. At the curves 35, 392, and 37 it will be seen, however, that the points of the shoes come into play against the walls of the groove to prevent twisting of the block 57 in the groove. For instance, at the bend 35 the two points 60 61 engage the outer walls 63 of the groove to prevent turning of the bar in either direction. At the curve 392 the point 61 of the shoe 58 engages the outer wall of the groove to prevent turning of the bar in the one direction permitted by the block 57, and, again, at curve 37 first the opposite points 61 64 of the shoe 58 and then the opposite points 65 60 of the other shoe, 59, prevent, in coöperation with the block 57, the bar from turning.

The walls of the vertical portions 31 33 of the groove 261 may, if desired, be stepped, as shown at 66 67, so as to enable both shoes to engage at their edges for a steadying effect.

By the construction thus described the plate-carrying shaft 27 is held at all times in non-rotary position, so that its carrying-arms 46 depend vertically to receive or discharge a plate.

We do not wish to limit ourselves to shoes of the exact diamond shape shown and described, for obviously other shapes could be made to answer the same purpose; but we desire to cover shoes of any kind for running in grooves to hold the carrying-bar against turning.

The front of the casing 1 is preferably closed by a door 68, having a ruby window 69, through which the interior of the device may be observed. Preferably the said window or the entire door is removable, so that a camera-lens, (not shown,) either alone or upon a front board, may be applied and the device used as a camera. In this case the plate is held by the carrying-bar in the focal plane and then carried on and developed, &c., or else returned to the holder 8, while other plates are exposed.

It will be understood that the handles for turning the different shafts described are removable, as well as the tube 23, leading to the developer-tank, so that, if desired, the base-piece 12, with all the parts supported thereon, may be removed and the casing employed simply for a dark room. Ordinarily the rear door 3 having been removed the frame 7, with cuffs 701, is taken away, the sash 5 pushed up, and plate-holders just as taken from the camera are inserted. In the construction shown a holder can be put at each side of the upright pieces 26 and another left in the rear part of the chamber. Then the cuffs 701 are replaced, and by inserting his hands the operator can take the plates from their camera-holders and subject them to the manipulation of the machine.

It will be understood that by the term "plates" we include glass plates, films, papers, and everything of like nature. Films are easily handled by our improved device, by means of the usual kits 70, (shown in Figs. 10 and 13,) and for papers we provide frames 71, as in Figs. 14 and 15, which may be adapted, if necessary, to make up the dimensions of the paper to that required by the device. "Portable" is also used in the sense of adapted to be carried in the hand, it being understood that our device is not a large affair to be moved around on wheels, but a small device commensurate with cameras.

Various modifications of detail construction may be employed without departing from the spirit and scope of our invention, and we do not wish to limit ourselves by the positive descriptive terms herein employed except as the state of the art may require.

Having thus described the invention, what we claim as new is—

1. In a device of the character described, a casing provided at the rear with a sliding door for the insertion of plate-holders, light-tight cuffs at the rear of said door adapted to admit the operator's hands to remove the plates from their holders, a plate-rack and a developer-tank and a fixing-solution tank all in said casing and fixed with respect to vertical movement, and a mechanical carrier operable from the outside of the casing and adapted to travel both vertically and horizontally for transferring plates from said rack to the tanks in succession.

2. The combination with a casing adapted to be closed light-tight, and a plate-rack and a developer-tank and a fixing-solution tank all in said casing, of a carrier in said casing, operable from the outside and adapted to travel both vertically and horizontally for transferring plates between said rack and tanks.

3. The combination with the casing adapted to close light-tight, of a developer-tank and a fixing-solution tank in said casing, a cock on the outside of said casing, a removable discharge-tube leading from the lower part of the developer-tank to said cock, a filling-tube leading from outside the casing into the top of said developer-tank, and means in said casing, operable from the outside, for mechanically inserting plates into, and removing them from, said tanks.

4. In a device of the character described, a casing adapted to be closed light-tight, said casing having at one end a slidable sash carrying a ruby glass and a removable frame having flexible cuffs, and at the other end having a door adapted to be removed to permit a camera-lens to be applied to the casing, and means within said casing for handling plates from the outside of the casing.

5. In a mechanical developing device, a casing adapted to be impervious to light, a tank for developing fluid adapted to receive a plate in vertical edgewise position, said tank being fixed in the casing, and a carrier within said casing and movable in both vertical and horizontal directions for inserting plates into said tank and agitating them therein.

6. In a device of the character described, a casing adapted to be made impervious to light, a removable support in said casing, a fixing-solution tank and a developer-tank mounted on said support, both said tanks being stationary, and a carrier adapted to travel both vertically and horizontally also mounted on said support for transferring plates to and from said tanks.

7. In a device of the character described, the combination of a casing adapted to be made impervious to light, a removable support in said casing, a fixing-solution tank and a developer-tank mounted on said support, side plates upon said support providing slideways or tracks, a plate-carrier adapted to travel in said ways to transfer plates to and from said tanks, and means for operating said carrier from outside the said casing.

8. The combination of a casing adapted to be made impervious to light, a removable support in said casing, a plate-rack and a fixing-solution tank and a developer-tank mounted upon said support, side plates upon said support providing grooves or slideways extending from one part of said support to another, a plate-carrier adapted to travel in said grooves, means for operating said carrier from outside the casing, and means for moving said plate-rack and fixing-solution tank upon the support.

9. The combination of a casing adapted to be made impervious to light, a plate-rack and a fixing-solution tank slidably mounted in said casing and connected to each other, a developer-tank, side plates providing ways or grooves extending between said rack and tanks, a carrier adapted to travel in said ways, means for operating said carrier from outside the casing, and means for moving said plate-rack and fixing-solution tank.

10. In a photographic plate-developing device, the combination with a casing and suitable tanks, of side plates providing grooves or ways extending from one part of said casing to another, a plate-carrier having a transverse portion adapted to slide at its ends in said ways, means for holding said transverse portion against turning in said grooves, and means for moving said carrier from outside the casing.

11. The combination with the casing and tanks for chemicals, of side plates providing at their facing sides grooves centrally slotted at the bottom, a plate-carrier having a transverse portion seated at its ends in the slots of said grooves, means upon said carrier entering the grooves to prevent turning of the carrier, and means for moving said carrier from outside the casing.

12. The combination with the casing and tanks for chemicals, of side plates providing at their facing sides grooves centrally slotted at the bottom, a plate-carrier having a transverse portion seated at its ends in the slots of said grooves, shoes fixed upon said transverse portion in said grooves and preventing turning of the carrier, and means for moving said carrier from outside the casing.

13. The combination with the casing having a track therein, of a plate-rack and a fixing-bath mounted upon said track in a fixed predetermined relation to each other, one of them having projections or pintles at its opposite ends, a transverse shaft mounted in said casing and having fixed arms adapted to engage said projections, means for turning said shaft, a developer-tank upon the track, and means for transferring plates from the said rack to the developer-tank and then to the fixing-bath.

14. The combination with opposite frames or plates providing ways or tracks, of a plate-carrying bar engaging near its opposite ends said ways or tracks and projecting beyond the same, a shaft journaled in said frames or plates parallel to the carrying-bar, arms fixed on said shaft and slotted to receive the ends of the carrying-bar, and means for turning said shaft.

15. The combination with opposite frames or plates providing ways or tracks, of a plate-carrying bar engaging near its opposite ends said ways or tracks and projecting beyond the same, a shaft journaled in said frames or plates parallel to the carrying-bar, arms fixed on said shaft and slotted to receive the ends of the carrying-bar, means for turning said shaft, and means for holding said carrying-bar against rotation.

16. The combination with opposite frames or plates providing ways or tracks, of a transverse plate-carrier comprising a tubular portion mounted at its opposite ends in said ways, opposite rods slidably mounted in said tubular portion, springs holding said rods together, plate-grasping arms on the outer ends of said rods, operating-arms on the inner ends of said rods, means for sliding said plate-carrier, and means for automatically engaging said operating-arms.

17. The combination with a plate-rack and ways or tracks at opposite sides thereof, of a plate-carrier arranged transversely in said ways or tracks, said carrier having oppositely-sliding rods providing at their outer ends arms for grasping a plate and at their inner ends having operating-arms, and a hinged tripping-piece or spreader adapted to pass between the said operating-arms as the carrier approaches the plate-rack and to be pushed idly out of the way as the carrier moves away from the rack.

18. The combination with a fixing-solution tank and ways or tracks at opposite sides of the same, of a plate-carrier arranged transversely in said ways or tracks, said carrier having oppositely-sliding rods providing at their outer ends arms for grasping a plate and at their inner ends having operating-arms, a spreader adapted to be forced between the said operating-arms, and means for independently moving said carrier along its ways or tracks and for operating said spreader.

19. The combination with a plate-rack and a fixing-bath simultaneously adjustable, and ways or tracks at opposite ends of the same, of a plate-carrier comprising a tubular body portion mounted at its ends in said ways or tracks, oppositely-sliding rods mounted in said body portion and having at their outer ends grasping-arms and at their inner ends operating-arms, springs holding said sliding rods resiliently toward each other, means for moving said carrier in its ways or tracks, an automatic trip adapted to pass between the operating-arms as the carrier approaches the plate-rack and tip idly out of the way as the carrier moves away from the rack, and a manually-operated spreader adapted to be forced between the operating-arms of the carrier as it is brought into position over the fixing-bath to discharge a plate.

20. The combination with the opposite plates 26, 26, having slotted grooves in their facing sides, of a plate-carrier having a transverse portion arranged with its ends in said slots, shoes fixed upon said transverse portion to travel in said grooves and engage the walls thereof to prevent rotary movement of the carrier, and means for sliding said carrier.

21. The combination with opposite plates having slotted grooves in their facing sides, said grooves having vertical, horizontal and curved portions, of a plate-carrier having a transverse portion mounted at its ends in said slots, and dissimilar sets of shoes upon said transverse portion near its ends adapted to travel one in each of said grooves, one or the other of said sets of shoes always holding the carrier against rotary twisting.

22. The combination with opposite plates having dissimilar slotted grooves in their facing sides, said grooves having vertical, horizontal and curved portions, of a plate-carrier having a transverse portion mounted at its ends in said slots, and dissimilar sets of shoes upon said transverse portion near its ends and adapted to travel one in each of the said grooves, one or the other of said sets of shoes always holding the carrier against rotary twisting.

23. The combination with opposite frames or plates each providing a slot and one providing a shoulder adjacent to its slot, of a plate-carrier adapted to slide at its ends in said slot and a fixed member upon said carrier to engage the shoulder to prevent rotation of the carrier.

In testimony that we claim the foregoing we have hereunto set our hands.

HARRY A. STEVENSON.
   ALEXANDER N. BRUNNER.

Witnesses:
  RUSSELL M. EVERETT,
  M. V. DOYLE.